(12) United States Patent
Kuznicki et al.

(10) Patent No.: US 7,152,932 B2
(45) Date of Patent: Dec. 26, 2006

(54) FLUID POWER ACCUMULATOR USING ADSORPTION

(75) Inventors: Steven M. Kuznicki, Edmonton (CA); Wayne Scott Kaboord, Mequon, WI (US); Roger James Briggs, Colgate, WI (US); Richard Randel Lyman, Jr., Chaska, MI (US); Orhan Talu, Richmond Heights, OH (US); Edward John Hummelt, Greenfield, WI (US)

(73) Assignee: Eaton Corporation, Cleveland, OH (US)

( * ) Notice: Subject to any disclaimer, the term of this patent is extended or adjusted under 35 U.S.C. 154(b) by 121 days.

(21) Appl. No.: 10/867,251

(22) Filed: Jun. 14, 2004

(65) Prior Publication Data

US 2005/0275280 A1    Dec. 15, 2005

(51) Int. Cl.
*B60T 17/04* (2006.01)

(52) U.S. Cl. .................. 303/87; 303/DIG. 11; 138/30; 138/31

(58) Field of Classification Search .................. 303/11, 303/DIG. 11, 87; 188/298; 138/30, 31; 207/64.27
See application file for complete search history.

(56) References Cited

U.S. PATENT DOCUMENTS

| | | | |
|---|---|---|---|
| 3,692,368 A * | 9/1972 | Alexander | .................. 305/146 |
| 4,395,880 A | 8/1983 | Berchowitz | |
| 5,114,318 A | 5/1992 | Freeborn | |
| 5,655,569 A * | 8/1997 | Tackett | .................. 138/30 |
| 5,799,562 A | 9/1998 | Weinberg | |
| 5,967,623 A * | 10/1999 | Agnew | .................. 303/87 |
| 6,092,552 A * | 7/2000 | Takamatsu et al. | ........... 138/30 |
| 6,662,591 B1 * | 12/2003 | Pfister et al. | .................. 62/497 |
| 6,751,958 B1 * | 6/2004 | Wright et al. | .................. 60/649 |
| 6,789,577 B1 * | 9/2004 | Baltes | .................. 138/30 |
| 6,848,755 B1 * | 2/2005 | Yuda et al. | .................. 303/87 |
| 2003/0027034 A1 | 2/2003 | Venkatesan et al. | |
| 2003/0103850 A1 | 6/2003 | Szulczewski | |
| 2003/0157390 A1 | 8/2003 | Kreefer et al. | |
| 2004/0050042 A1 | 3/2004 | Frazer | |

* cited by examiner

*Primary Examiner*—James McClellan
*Assistant Examiner*—Mariano Sy
(74) *Attorney, Agent, or Firm*—Paul V. Keller, LLC

(57) ABSTRACT

The invention relates to a fluid power accumulator in which the fluid undergoes a state change as the system is pressurized to store energy. A state change can be a phase change, a chemical reaction, or a combination of these. Generally the state change results from the interaction of a compressible fluid contained in the accumulator with another substance, which can be a fluid or a solid. Preferably, the state change includes the physical adsorption of a fluid by a solid adsorbant. The invention can improve the energy storage density of a fluid power accumulator, allow a given energy storage density to be achieved at a lower maximum pressure, facilitate heat transfer and storage within an accumulator, and/or improve accumulator efficiency by storing energy in a form other than thermal energy, such as in the form of chemical energy.

32 Claims, 2 Drawing Sheets

US 7,152,932 B2

FLUID POWER ACCUMULATOR USING ADSORPTION

FIELD OF THE INVENTION

The present invention relates to fluid power accumulators and regenerative braking systems for vehicles.

BACKGROUND OF THE INVENTION

A concern relating to the use of fluid power accumulators in smaller vehicles is the large size of the accumulators. One way to make accumulators smaller is to operate them at higher pressure, thereby increasing their energy storage density. There is, however, a peak pressure at which an accumulator can operate. The peak pressure is a design specification that must be met by plumbing, pumps, and valves of any hydraulic systems associated with the fluid power accumulator. Increasing the peak pressure increases the cost of all these components.

For a given peak pressure, there is an optimal initial charge of compressible fluid that maximizes the energy storage capacity of the accumulator. The storage capacity is given by:

$$W = -\int_{V_0}^{V_1} P \, dV \quad (1)$$

Where W is the work that can be done on the system and hence the energy that can be stored, $V_0$ is the maximum volume for the chamber into which the compressible fluid is charged, and $V_1$ is the volume of the chamber at which the maximum pressure is reached. The pressure is a function of the volume. If the initial fluid charge is small, the system can be extensively compressed, but the average value of P over the volume range is low. If the initial charge is large, the system can only be compressed a little before the maximum pressure is reached; P is large but the possible change in volume is small.

The variation of pressure with volume depends on the properties of the compressible fluid, the heat capacity of the system, and whether or not the system loses heat to the surroundings. If the fluid behaves as an ideal gas, the relationship between pressure and volume is given by:

$$P = \frac{nRT}{V} \quad (2)$$

where n is the number of moles in the gas charge, R is the gas constant, and T is the temperature. The largest storage capacity would be achieved if T did not increase, however, T normally increases as the fluid is compressed. All the work done on the system goes into thermal energy, reflected by a temperature rise. Losing thermal energy to the surroundings is undesirable, as the heat contains the energy stored in the system.

The temperature increase and its effect on storage capacity can be mitigated by a foam or other agent that acts as an internal heat sink. The benefit is offset by the volume taken up by the foam or other agent. All things considered, a foam is generally helpful. An optimum initial charge for the fluid power accumulator gives about ⅓ the maximum pressure.

There continues to be a long felt need for more compact, reliable, and efficient energy storage units for use in regenerative braking.

SUMMARY OF THE INVENTION

The following presents a simplified summary in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later.

The invention relates to a fluid power accumulator in which a portion of the compressible fluid charge undergoes a state change as the system is pressurized to store energy. A state change can be a phase change, a chemical reaction, or a combination of these. Generally the state change results from the interaction of the compressible fluid with another substance, which can be a fluid or a solid. Preferably, the state change includes physical adsorption of a compressible fluid by a solid adsorbant.

In one embodiment, the invention improves the energy storage density of a fluid power accumulator. In another embodiment, the invention allows a given energy storage density to be achieved at a lower maximum pressure. In a further embodiment, the invention facilitates heat transfer and storage within an accumulator having an internal heat sink, thereby improving the efficiency of the accumulator. In a still further embodiment, the invention improves efficiency by storing energy in a form other than thermal energy, such as in the form of chemical energy. One or more of these embodiments can be combined to reduce the size, reduce the cost, and/or improve the efficiency of fluid power accumulator-based regenerative braking systems for vehicles.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
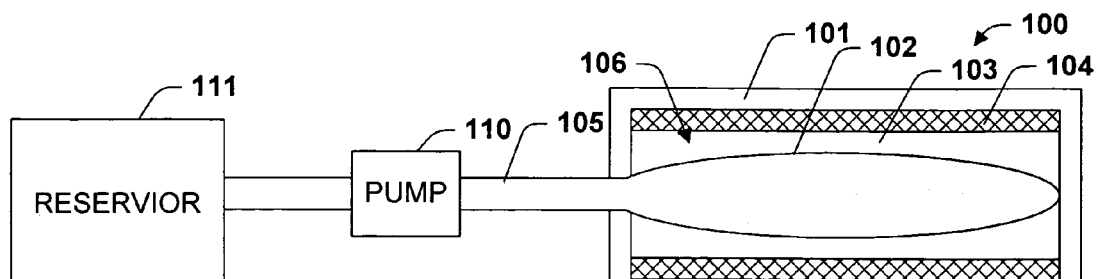
FIG. 1 is a schematic illustration of a fluid power accumulator according to one embodiment of the invention.

One aspect of the present invention relates to a fluid power accumulator in which a portion of a compressible fluid provided for energy storage undergoes a change of state during compression. The change of state reduces the tendency of the pressure to increase with decreasing volume and thereby allows the starting pressure to be higher for a given maximum pressure and ultimately allows the storage density to be increased.

As the term is used here, a change of state is a change of phase, a chemical reaction, or a combination of the two. This definition does not include changes that affect only an intrinsic "thermodynamic state", i.e., changes in the pressure or temperature that do not result in net phase transitions or chemical reactions. A phase is a distinct homogeneous portion of matter present in an otherwise non-homogeneous physicochemical system. A phase can be, for example, a gas phase, a liquid phase, a solid phase, or an adsorbed phase. Examples of changes of state include the condensation of a gas into a liquid, the adsorption of a gas onto the surface of a solid adsorbant, the concentration of a gas inside carbon nanotubes, and the incorporation of material into a Clathrate. Adsorption is the preferential partitioning of a substance from the gas phase to the surface of a solid. Adsorption can be chemical or physical.

Most state changes that increase density are exothermic, whereby heat associated with the state change is additive with the heat that results from the work on the system. If the system is improperly designed, the increase in thermal energy will overwhelm the benefit of the density increase. A starting point for designing an effective system is to write an expression for the change in pressure with change in state. A system having two states can be described in terms of three variables: the temperature, the pressure, and x, a progress variable representing the extent of conversion from the first phase to the second. Additional progress variables would be added to describe a system with more than two states.

At constant volume, for example as the system is equilibrating following a small compression, the effect of changes in the system variables on volume must balance, whereby:

$$\left(\frac{\partial V}{\partial x}\right)_{P,T} dx + \left(\frac{\partial V}{\partial P}\right)_{x,T} dP + \left(\frac{\partial V}{\partial T}\right)_{x,P} dT = 0 \quad (3)$$

which can be rearranged to give:

$$\frac{dP}{dx} = \frac{-1}{\left(\frac{\partial V}{\partial P}\right)_{x,T}} \left(\left(\frac{\partial V}{\partial x}\right)_{P,T} + \left(\frac{\partial V}{\partial T}\right)_{x,P} \frac{dT}{dx}\right) \quad (4)$$

The derivatives on the right hand side can all be determined from the physical properties of the materials. Equations of state, heat capacities, and enthalpies can all be estimated from readily available data. Where the derivative of pressure with respect to the progress variable is negative, the state change can have a positive effect on the energy storage density.

To better illustrate the design process, a simplified example will be considered. In this example, the first state is an ideal gas phase and the second state is an adsorbed state or other dense phase. The volume occupied by the adsorbed phase will be taken as negligible, whereby the equation of state for the gas gives:

$$V = \frac{(1-x)nRT}{P} + V_1 \quad (5)$$

where x represents the fraction of the gas converted to the adsorbed phase, n represents the initial number of moles of the gas, and $V_1$ is the volume occupied by the adsorbant and any inert materials in the system. Obtaining the partial derivatives from Equation (5), substituting them into Equation (4), and simplifying gives:

$$\frac{dP}{dx} = \frac{P}{(1-x)}\left(-1 + \frac{(1-x)}{T}\frac{dT}{dx}\right) \quad (6)$$

The change in temperature with phase is determined by a balance between the thermal energy released by the phase change and the thermal energy taken up by the system:

$$n\Delta H dx = ((1-x)nC_{v1} + xnC_{v2} + mC_{v3})dT \quad (7)$$

where $\Delta H$ is the heat released by the phase change, $C_{v1}$ is the constant volume molar heat capacity of the gas, $C_{v2}$ is the constant volume molar heat capacity of the adsorbed phase, m is the number of moles of an inert phase used as a heat sink, and $C_{v3}$ is the molar heat capacity of the inert phase. Substituting this expression into equation (6) gives:

$$\frac{dP}{dx} = \frac{P}{(1-x)}\left(-1 + \frac{\Delta H}{TC_{v1} + \frac{x}{1-x}TC_{v2} + \frac{m}{n(1-x)}TC_{v3}}\right) \quad (8)$$

Where the simplifying assumption on which it is based apply, Equation (8) can be used to design systems where a phase change reduces the pressure increase. For example, if the first phase is steam and the second phase is water, at 1 atm and 100° C., $\Delta H$ is about 36 kJ/mol and $TC_{v1}$ is about 8 kJ/mol. If the system is primarily steam, the first term in the denominator of the second term in parenthesis in Equation (8) dominates the denominator and condensation would actually increase the pressure. On the other hand, if the system contains a lot of liquid or a lot of a third substance that acts as an internal heat sink, then condensation can reduce the pressure. Equations (4) and (8) can be used to determine how much of an internal heat sink is needed to make any given system work.

Le Chatelier's principle indicates that following a pressure increase a state change will occur if and only if the state change mitigates the pressure increase. In some cases, however, the state change may occur slowly or require a spark or catalyst to initiate. For a state change to be useful in energy storage according to the invention, it must generally be reversible. A reversible state change occurs quickly and spontaneously during compression and quickly and spontaneously in the opposite direction during expansion. If the state change does not reverse when the system is expanded, the stored energy is generally not recovered. If the state change occurs too slowly 5 during either compression or expansion, the system may depart widely from equilibrium and a significant amount of energy may be irreversibly lost through entropy. Generally, reversible state changes include phase changes and reactions that involve the formation or creation only of comparatively weak bonds.

Applying Le Chatelier's principle to the steam-water system, following a pressure increase, water will either evaporate or condense, whichever mitigates the pressure increase. As the system is compressed, the temperature rises and the vapor pressure of the water increases. $TC_{v2}$ for liquid water at 25° C. is about 22 kJ/mol. If the initial value for x is about 0.56 or greater, assuming minimal loss of heat to the surroundings and vessel walls, evaporation will mitigate the pressure increase and water will evaporate as the system is compressed until all the water has evaporated. Because evaporation is endothermic, the temperature increase will also be mitigated. If the initial value of x is less than about 0.56, condensation will mitigate the pressure increase and steam will condense as the system is compressed until the entire system is liquid. Regardless of the initial value of x, this particular system is not in an appropriate pressure range for a typical fluid power accumulator. Rather, it is used to provide a better appreciation for the general principles of the invention.

In a preferred embodiment, the state change induced by compression involves a reduction in density at constant temperature. In the evaporation example discussed above, the reduction in pressure with state change is a consequence of heat being taken up. The reduction in pressure can therefore be no better than what is achieved with a large, compact internal heat sink (assuming rapid equilibration). With a large internal heat sink, evaporation will not occur as a result of compression. Examples of systems in which a state change involves a reduction in density at constant temperature include adsorption of a gas and a chemical reaction that reduces the number of moles in a gas phase. Where the system involves a change of phase, preferably the second phase has at least about twice the density of the first phase, more preferably at least about five times the density, and still more preferably at least about ten times the density.

A further characteristic of a preferred system is one that releases little or no heat with a density-increasing change of state. As a rule, condensation involves a relatively large release of heat, as does chemisorption. Physical adsorption involves a comparatively small release of heat. Preferably, the heat released with the state change is no more than about 30 kJ/mol, more preferably no more than about 20 kJ/mol, still more preferably no more than about 15 kJ/mol, and most preferably essentially no heat is released or the state change is endothermic.

To obtain large improvements in energy storage density, it is desirable that the effect of the state change on pressure persist over the entire operating range. Preferably at least about 40% of the material used for energy storage undergoes the state change over the range of operation. Where the activity of the second state increases rapidly as material transitions to the second state, the range where benefits are realized is reduced. For example, where the state change is a chemical reaction and the product is a gas, the concentration of the product gas increases with progress of the phase change. Eventually, the product concentration can become too great for any further energy storage benefit to be realized. This effect is not apparent from Equation (8), which includes simplifications that do not apply to this example, but can be shown through a full expression of Equation (4). Chemical adsorption is similar to a reacting system in that the number of active sites on the surface available for the state change decreases with progress and the number of occupied sites available for the reverse process increases. On the other-hand, in physical adsorption the adsorbate can form multiple layers over the surface. Once the first layer is formed, the activity of the adsorbed phase changes slowly with progress of the state change. Physical adsorption systems are therefore in general better candidates for fluid power accumulators.

It has already been mentioned that large heat releases on state change are undesirable. A further point in this regard is that the enthalpy of the state change is also related to the equilibrium constant. Where there is a large heat released by a state change, a small increase in temperature can drive the state change in the reverse direction. Therefore, a small or negative heat release on state change is desirable not only to avoid releasing too much thermal energy but also to increase the likelihood that the state change will be beneficial through the entire range of power accumulator operation.

For all the foregoing reasons, in a preferred embodiment the first state is a compressible fluid and the second state is an adsorbed state of the fluid. Examples of suitable adsorbants for forming the adsorbed state can include molecular sieves, alumina, silica, activated carbon, and carbon nanotubes. Further options include oxides, carbonates, and hydroxides of alkaline earth metals such as Mg, Ca, Sr, and Be or alkali metals such as K or Ce. Still further examples include metal phosphates, such as phosphates of titanium and zirconium. Preferably the adsorbant has a very high surface area. In one embodiment, the surface area of the adsorbant is at least about 100 $m^2/g$, in another embodiment, it is at least about 400 $m^2/g$, and in a further embodiment, it is at least about 1000 $m^2/g$.

Molecular sieves are materials having a crystalline structure that defines internal cavities and interconnecting pores of regular size. Zeolites are the most common example. Zeolites have crystalline structures generally based on atoms tetrahedrally bonded to each other with oxygen bridges. The atoms are most commonly aluminum and silicon (giving aluminosilicates), but P, Ga, Ge, B, Be, and other atoms can also make up the tetrahedral framework. The properties of a zeolite may be modified by ion exchange, for example with a rare earth metal or chromium.

For high-pressure fluid power accumulators with high energy storage densities, a relatively inert compressible fluid is generally preferred. Examples of relatively inert fluids include $H_2$, He, Ne, Ar, Xe, Kr, and $N_2$. If a more polar fluid is used, such as carbon dioxide, the adsorbant is preferably relatively inert, e.g., carbon.

One example of a suitable compressible fluid-adsorbant system effective at a peak operating pressure of around 1500 psia is $N_2$-zeolite. The zeolite can be Chabazite or a de-aluminated Y-type zeolite (DAY). DAY contains a silicon to aluminum ratio of 4 or more. Another suitable fluid-adsorbant system is Ar over a very high surface area activated carbon or carbon nanotubes. A commercially available very high surface area activated carbon is Norit R1, which is a carbon based on macadamia nut shells and available through the Osaka Gas Company. The adsorbant can occupy, for example, from about a tenth to about a third of the accumulator maximum power accumulation chamber volume.

The adsorbant is typically combined with a binder and either formed into a self-supporting structure or applied as a coating over an inert substrate. A binder can be, for example, a clay, a silicate, or a cement. Generally, the adsorbant is most effective when a minimum of binder is used. Preferably, the adsorbant structure contains from about 3 to about 20% binder, more preferably from about 3 to about 12%, most preferably from about 3 to about 8%. Preferably, the adsorbant with any binder or inert substrate is formed into a cohesive mass that resists degradation during vehicle operation. The adsorbant structure can be fastened directly to a vessel wall or held in place by a mesh.

The adsorbant structure preferably contains macro-pores, whereby the entire volume of the adsorbant is accessible without having to pass through the small pores characteristic of high-surface area adsorbants. Such a structure can be obtained, for example, by forming pellets of small adsorbant particles held together with a binder. A group of pellets may themselves be formed into a cohesive mass using more binder, or in some cases a sintering process.

A fluid power accumulator generally includes a housing having first and second chambers, separated by a mobile barrier. The first chamber contains a relatively incompressible fluid (a hydraulic fluid) and communicates with systems outside the fluid power accumulator for energy transfer. The second chamber is generally sealed and contains a compressible fluid. The second chamber is where the energy is primarily stored and may be referred to as an energy storage, chamber. Pumping hydraulic fluid into the first chamber moves the barrier to decrease the volume of the second chamber and compress the compressible fluid to compress. Allowing hydraulic fluid to flow out of the first chamber moves the barrier in the opposite direction and increases the volume of the second chamber, causing the compressible fluid to expand. Rather than a first chamber, a fluid power accumulator can have a mechanical system that does not require hydraulic fluid, however, the second chamber, the mobile barrier, and the compressible fluid within the second chamber are always used. The mobile barrier generally has a fixed range of motion defining a maximum volume and a minimum volume for the energy storage chamber. A compression cycle refers to the motion of the barrier from the point of maximum volume to the point of minimum volume.

FIG. 1 is a schematic illustrate of an exemplary fluid power accumulator 100 according to one aspect of the present invention. The fluid power accumulator 100 includes housing 101 and elastomeric mobile barrier 102. The housing 101 and mobile barrier 102 enclose a chamber 106 containing a gas 103 and an adsorbant 104. The mobile barrier 102 can be driven by hydraulic fluid 105 to reduce the volume of the chamber 106 and compress the gas 103. As the gas 103 compresses part of it becomes adsorbed by the adsorbant 104. The hydraulic fluid 105, which is drawn from reservoir 111, is moved by pump 110, which can be part of a braking system. The power stored in the accumulator 100 can be used to drive the pump 110 in reverse, which can in turn power a vehicle.

Preferably, the adsorbant 104 is distributed around the outer walls of the chamber 106. During compression the gas heats. The adsorbant heats as well, but due to its thermal mass generally heats more slowly. Over time the gas and adsorbant temperatures may equilibrate, but having the lower temperatures near the outside delays the loss of heat to the surroundings. Preferably the housing 101 is insulated to further reduce the loss of energy to the surroundings.

Figure 2:
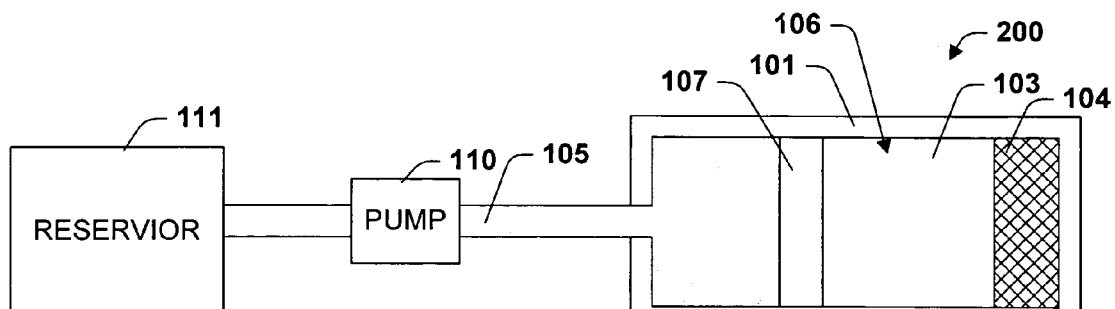
FIG. 2 is a schematic illustration of a fluid power accumulator according to another embodiment of the invention.

FIG. 2 is a schematic illustration of another exemplary fluid power accumulator 200 according to another aspect of the invention. In FIG. 2, like elements are numbered as in FIG. 1. Whereas the mobile barrier 102 is an elastomeric material, the mobile barrier in FIG. 2, the piston 107, is generally rigid. A mobile barrier can also be a metal or elastomeric diaphragm as used in a diaphragm accumulator. Another type of mobile barrier is found in a bellows accumulator.

Figure 3:
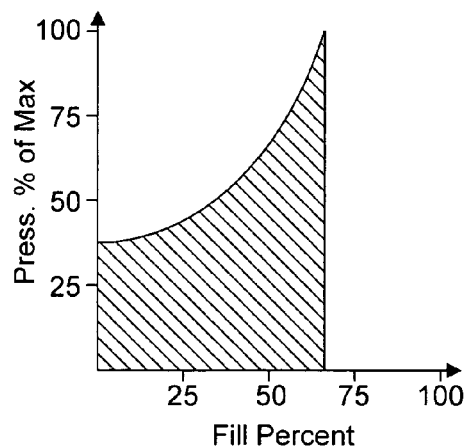
FIG. 3 is a plot of pressure versus volume for a conventional fluid power accumulator.
Figure 4:
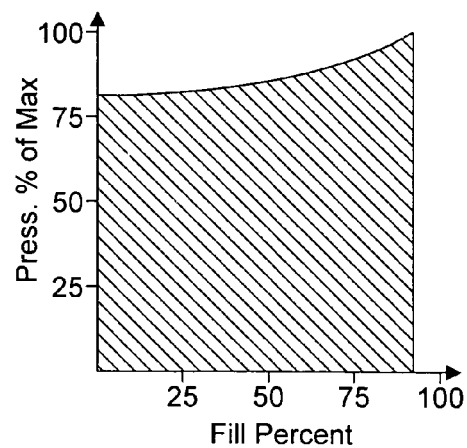
FIG. 4 is a plot of pressure versus volume for a nearly ideal fluid power accumulator according to one aspect the present invention.

FIGS. 3 and 4 together illustrate the potential improvement in energy storage allowed by the present invention. FIG. 3 plots pressure versus volume for a conventional fluid power accumulator with an optimal initial charge of compressible fluid. The pressure begins at about a third of the maximum and increases until the fluid has compressed by a factor of three. FIG. 4 plots pressure versus volume for a nearly ideal fluid power accumulator according to the present invention. The pressure begins near the maximum and remains near the maximum as the fluid is compressed through nearly the entire volume. In both cases, the energy storage is the area under the curve. In FIG. 4, the area is considerably greater.

The difference in energy storage potential can be more precisely stated. Integrating Equation (1) assuming the gas is ideal as in Equation (2) and assuming the temperature remains constant gives:

$$W = P_0 V_0 \ln\left(\frac{P_{max}}{P_0}\right) \quad (9)$$

where $P_{max}$ is the maximum pressure, $P_0$ is the initial pressure, and $V_0$ is the initial volume. While it is conceivable that slightly more work might be obtained with an appropriate non-ideal gas, for all practical purpose Equation (9) represents the most energy storage that can be achieved without a state change. Taking the derivative of Equation (9) and setting it to zero gives the initial pressure at which the total work is maximized, which is:

$$P_0 = 0.368 P_{max} \quad (10)$$

Substituting this pressure into Equation (9) gives the maximum work for a conventional system:

$$W = 0.368 P_{max} V_0 \quad (11)$$

Generally, the actual energy storage capacity will be lower because the compressible fluid heats on compression. With the present invention, the work can approach:

$$W = P_{max} V_0 \quad (12)$$

The work in Equation (12) will be referred to as the theoretical maximum energy storage. The theoretical maximum cannot be achieved by the present invention, but can be approached. Preferably, a fluid power accumulator according to the present invention can store at least about 40% of the theoretical maximum energy, more preferably at least about 50%, and still more preferably at least about 60%.

While the main focus of the invention is on increased energy storage density, another important advantage relates to rapid and reversible storage of energy. Two factors can limit the degree to which work done on a fluid power accumulator can be recovered as useful energy: heat loss to the surroundings and non-equilibrium conditions in the accumulator. Heat loss as a detrimental factor is easily understood. The rate of heat loss can be reduced by insulation. Another way to limit the rate of heat loss is to reduce the system's maximum temperature by adding an internal heat sink. An internal heat sink is a mass within the energy storage chamber. An internal heat sink can in principle reduce the system's maximum temperature and improve heat retention, however, an internal heat sink may not be very effective if the system does not equilibrate quickly.

Figure 5:
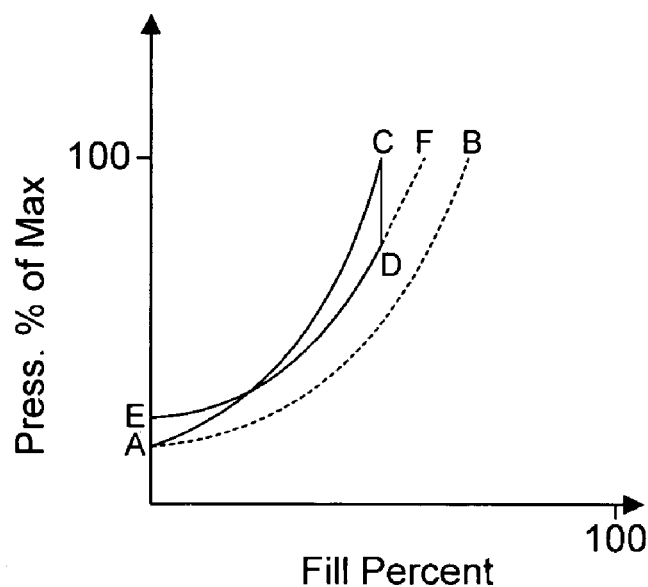
FIG. 5 is a plot of the variation of pressure with volume as a fluid power accumulator goes through ideal (always close to equilibrium) and non-ideal (departing significantly from equilibrium) operations.

FIG. 5 is a graph illustrating the importance of rapid equilibration and in particular the cost of slow equilibration when an inert heat sink is added to a fluid power accumulator. In FIG. 5, the heat sink is copper filings, which are assumed to be inert and not functional according to the present invention. As the system is compressed, the gas heats. If the system is compressed very slowly, the temperatures of the gas and the copper filings may have time to equilibrate, the temperature rise is mitigated, and the system can essentially follow the ideal pressure versus volume curve represented by the dashed line from point A to point B. More realistically, the system compresses too quickly for meaningful heat transfer to occur and the system follows the line from A to C. Because the gas heats excessively, pressures are higher during compression and the maximum pressure is reached at a lower fill percent.

If after rapid compression to point C, the system is allowed to equilibrate, the temperature of the gas drops, its pressure drops, and the system travels from point C to point D. Point D lies on the curve from point E to point F, which like the curve from point A to point B is an ideal curve that can only be followed if the system is compressed or expanded slowly enough that the system remains essentially at equilibrium. After the system has cooled to point D, the fluid power accumulator can receive further power to reach point F. Point B is unattainable without loosing energy through heat to the surroundings. If the system is decompressed very slowly from point D or point F, the system reaches point E. At point E, the temperature of the system is higher than the starting temperature. The energy required to heat the system from point A to point E equals the amount of useful energy lost during the compression cycle due to non-equilibrium conditions. For a system with copper filings, equilibration is likely to be too slow on both the compression and the expansion cycles and each cycle will likely involve irreversible losses of useful energy to heat.

Figure 6:
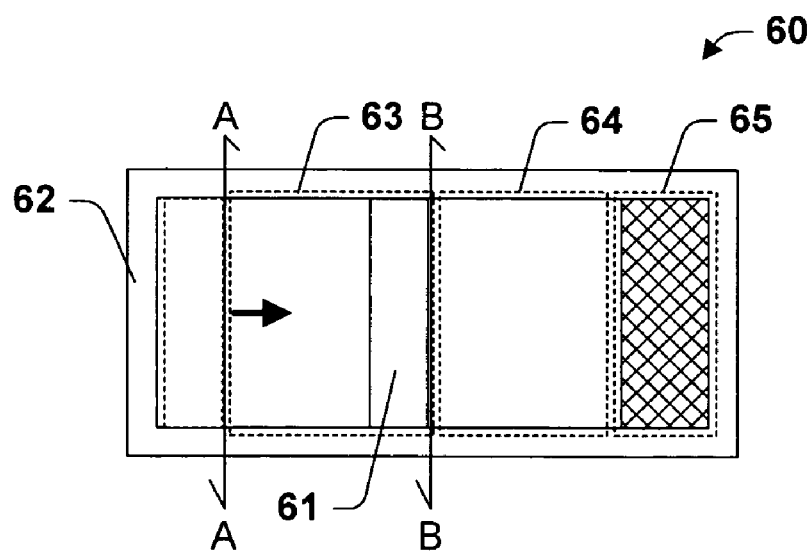
FIG. 6 is a schematic illustration of a fluid power accumulator logically divided into several regions for purposes of discussion.

The present invention provides a mechanism of facilitating rapid thermal energy storage in a non-compressible solid with a heat capacity that is large compared to the heat capacity of a compressible fluid or a foam. FIG. 6 is provided to help explain this mechanism. FIG. 6 illustrates a fluid power accumulator 60 with a piston 61 and a shell 62. The volume initially enclosed by the shell is divided into three regions 63–65. Region 65 contains a solid with 50% porosity. Region 65 is four time the volume of region 64. As the piston 61 moves from position A to position B, the gas within region 63 is forced into the regions 64 and 65. The energy initially taken up by a region is equal to the work done at its boundaries. The work equals the volumetric flow driven past a boundary multiplied by the pressure at which it is driven.

A point of reference is the case where the solid is inert and there is no state change in the gas. Consider a small movement of the piston within region 63 where the piston begins almost at the boundary between regions 63 and 64 (the volume of region 63 can be neglected). The movement pushes a small volume of gas across the boundary between regions 63 and 64. This gas distributes equally in the free volumes of regions 64 and 65. Because the free volume of region 64 is 8 times free volume of region 65, only one part in nine (11%) of the gas moves across the boundary between regions 64 and regions 65. Therefore, 89% of the work done is done on region 64 and 11% is done on region 65. On a unit volume basis, twice as much work is done on region 64.

The solid in this example is intended as an internal heat sink. For example, the system may be designed for the internal heat sink to take up half the thermal energy and reduce the temperature rise by a factor of two. For the gas within region 65, heat transfer to the solid occurs very quickly, the gas within region 65 being in intimate contact with the solid. For the gas within region 64, however, the thermal energy must migrate a considerable distance before the solid in region 65 can take it up. According to the design, 50% of the thermal energy goes into the solid and the rest distributes evenly through the gas. 89% of the gas is in region 64, therefore, taking 89% of 50%, only 45% of the energy will be in region 64 at equilibrium. Because 89% of the energy initially appears in region 64, 44% of the energy must migrate by slow heat transfer processes to region 65.

According to the invention, however, some of the gas can be taken up by an interaction between the solid and the gas such as adsorption. If 40% of the gas displaced during compression is taken up by adsorption and the volume of the adsorbed phase is negligible, for a small volume of gas forced from region 63 into region 64, 40% of the gas is taken up by the solid within region 65 and the remaining 60% distributes between the free volumes in regions 64 and 65. One ninth of 60% is about 7%. The total flow across the boundary between regions 64 and 65 is about 47% of the volume driven across the boundary between regions 63 and 64. Accordingly, 53% if the work is done on region 64 and 47% of the work is done directly on region 65. On a unit volume basis, the work done in region 64 is less than a third the work done on region 65. For the solid to take up 50% of the thermal energy, and the remaining energy to be distributed evenly through the gas, only 8% need migrate by slow heat transfer process from region 64 to region 65. A similar effect could be achieved using a reaction catalyzed by the solid.

Thus, another aspect of the invention relates to a fluid power accumulator comprising a energy storage chamber that can be divided into first and second regions, the second region containing a substance, typically an incompressible solid, not present in the first region. During at least a portion of the compression cycle, through an interaction between a compressible fluid and the substance, the work done per unit volume on the second region exceeds the work done per unit volume on the first region. Nevertheless, due to the lower heat capacity of the first substance, the rate of temperature rise in the first region can be greater than or equal to that in the second region. The regions can be defined in any suitable fashion, however, the comparison between first and second regions cannot be made over a portion of the compression cycle where all or part of a region falls outside the energy storage chamber.

While most state changes that increase density are exothermic, some state changes according to the invention can serve to convert thermal energy into other forms. For example, consider a reversible reaction with gas phase products and reactants:

Increasing the pressure will have no direct significant effect on the activities of the products or the reactants, however, if the reaction is significantly exothermic or endothermic there will be an indirect effect through the temperature. As the system temperature increases, in accord with Le Chatelier's principle, the reaction will progress in one direction or another, whichever acts to mitigate the temperature increase.

In a preferred embodiment, a fluid power accumulator contains substances that react rapidly and reversibly under changes in temperature and also contains adsorbants that are strong for one or more products of the reaction in the endothermic direction but weak for the products in the exothermic direction. In this manner, a reaction can convert thermal energy into chemical energy and be driven by both adsorption and temperature increases. A disassociative adsorption may provide similar benefit.

The invention has been shown and described with respect to certain aspects, examples, and embodiments. While a particular feature of the invention may have been disclosed with respect to only one of several aspects, examples, or embodiments, the feature may be combined with one or more other features of the other aspects, examples, or embodiments as may be advantageous for any given or particular application.

The invention claimed is:

1. A fluid power accumulator having an energy storage density, comprising:
    an energy storage chamber having an enclosed volume defined in part by a mobile barrier configured such that moving the barrier causes the enclosed volume to increase or decrease; and
    a compressible fluid and a second substance contained in the enclosed volume under pressure;
    wherein the compressible fluid interacts with the second substance whereby moving the barrier to substantially decrease the enclosed volume causes a portion of the compressible fluid to undergo a change of state and returning the mobile barrier to its previous position substantially reverses the change of state;
    the change of state comprises one or more from the group consisting of:
    (a) a chemical reaction affecting the composition of the fluid; and
    (b) a transition of a portion of the fluid between distinct homogeneous portions of matter within the enclosed volume; and
    the change of state substantially increases the energy storage density of the fluid power accumulator.

2. A vehicle comprising the fluid power accumulator of claim 1.

3. The fluid power accumulator of claim 1, wherein the second substance is an adsorbant for the compressible fluid.

4. The fluid power accumulator of claim 3, wherein the adsorbant is a molecular sieve.

5. The fluid power accumulator of claim 3, wherein the adsorbant is carbon.

6. The fluid power accumulator of claim 3, wherein the adsorbant is principally distributed over interior surfaces of the chamber.

7. The fluid power accumulator of claim 1, wherein:
    the enclosed volume has a maximum size determined by a range of motion for the mobile barrier;
    the energy storage chamber has a maximum pressure at which it is configured to operate; and
    the fluid power accumulator can store at least about 40% of a theoretical maximum energy;
    wherein the theoretical maximum energy is the product of the maximum pressure and the maximum size.

8. The fluid power accumulator of claim 1, wherein the change of state comprises a chemical reaction.

9. The fluid power accumulator of claim 1, wherein the change of state comprises incorporation of the compressible fluid into a clathrate.

10. The fluid power accumulator of claim 1, wherein:
    the enclosed volume comprises first and second regions;
    the compressible fluid is distributed between the first and the second regions;
    the second substance is contained in the second region; and
    the fluid power accumulator is configured such that the barrier can be moved to decrease the enclosed volume in such a manner that work is done on the first and second regions and average temperatures consequently increase within the first and second regions;
    wherein the work done per unit volume on the second region exceeds the work done per unit volume on the first region during the movement.

11. The fluid power accumulator of claim 10, wherein during the movement the rate of temperature increase in the first region is greater than or equal to the rate of temperature increase in the second region.

12. A vehicle, comprising:
    a fluid power accumulator adapted to store energy in a variable volume container that encloses a volume containing matter distributed in at least two states;
    wherein substantially decreasing the enclosed volume of the container causes a part of the matter in the first state to transition into the second state;
    the two states are either:
    (a) two distinct homogeneous portions of matter within the enclosed volume; or
    (b) respectively products and reactants of a reversible chemical reaction; and
    the part of the matter in the first state transitioning into the second state substantially improves an enemy storage density of the fluid power accumulator; wherein the first state is a gas phase and the second state is an absorbed phase.

13. The vehicle of claim 12, wherein the adsorbed phase is formed with a molecular sieve.

14. The vehicle of claim 12, wherein the adsorbed phase is formed with high surface area carbon.

15. The vehicle of claim 12, wherein the adsorbed phase is formed with carbon nanotubes.

16. The vehicle of claim 12, wherein the adsorbed phase is formed with an adsorbant principally distributed near the outer surfaces of the container.

17. The vehicle of claim 12: wherein
    the enclosed volume has a maximum size;
    the variable volume container has a maximum pressure at which it is configured to operate; and
    the fluid power accumulator can store at least about 40% of a theoretical maximum energy;
    wherein the theoretical maximum energy is the product of the maximum pressure and the maximum size.

18. The vehicle of claim 12, wherein the transition from the first state to the second state includes a chemical reaction.

19. The vehicle of claim 18, wherein the chemical reaction is endothermic.

20. The vehicle of claim 12, wherein the transition from the first state to the second state comprises the incorporation of material into a clathrate.

21. A fluid power accumulator, comprising:
    a housing having a first chamber enclosing a first volume and a second chamber enclosing a second volume, the first and second chambers being separated by a mobile barrier, wherein moving the barrier causes the volume of the second chamber to either decrease or increase;
    wherein the first volume contains hydraulic fluid;

the second volume contains a compressible fluid and an adsorbant;

moving the barrier to decrease the second volume causes a portion of the compressible fluid to be adsorbed by the adsorbant; and moving the barrier to increase the second volume causes a portion of the adsorbed fluid to desorb wherein the adsorbing of the compressible fluid by the adsorbant substantially increases an energy storage density of the fluid power accumulator.

22. A vehicle comprising the fluid power accumulator of claim 21.

23. The fluid power accumulator of claim 21 wherein the adsorbant is a molecular sieve.

24. The fluid power accumulator of claim 21 wherein the adsorbant is carbon.

25. The fluid power accumulator of claim 21 wherein the adsorbant forms a layer over the interior of the housing.

26. The fluid power accumulator of claim 21 wherein:

the second volume has a maximum size determined by a range of motion for the barrier;

the second volume has a maximum pressure at which it is configured operates; and the fluid power accumulator can store at least about 40% of a theoretical maximum energy;

wherein the theoretical maximum energy is the product of the maximum pressure and the maximum size.

27. The fluid power accumulator of claim 26, wherein the fluid power accumulator can store at least about 50% of the theoretical maximum energy.

28. The fluid power accumulator of claim 21, wherein the second chamber contains a foam.

29. The fluid power accumulator of claim 21, wherein:

the second chamber comprises first and second regions;

the adsorbant is contained in the second region; and the fluid power accumulator is operative whereby during a portion of a compression cycle, work is done on the first and second regions and the work done per unit volume on the second region exceeds the work done per unit volume on the first region;

wherein the compression cycle comprises moving the mobile barrier to reduce the second volume and store energy therein.

30. The fluid power accumulator of claim 29, wherein doing work on the first and second regions causes average temperatures within those regions to rise; and the fluid cower accumulator is configured such that the rate of temperature increase in the first region during the portion of the compression cycle is greater than or equal to the rate of temperature increase in the second region.

31. The fluid power accumulator of claim 21, wherein:

the second chamber has a maximum volume and a minimum volume determined by a range of motion of the mobile barrier;

at maximum volume, the compressible fluid fills at least about 50% of the volume.

32. The fluid power accumulator of claim 31, wherein at minimum volume, at least about 30% of the compressible fluid is adsorbed.

* * * * *